(12) United States Patent
Czaplicki et al.

(10) Patent No.: US 6,422,575 B1
(45) Date of Patent: Jul. 23, 2002

(54) EXPANDABLE PRE-FORMED PLUG

(75) Inventors: Michael J. Czaplicki, Rochester; David D. Apfel, Attica, both of MI (US)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 09/524,298

(22) Filed: Mar. 14, 2000

(51) Int. Cl.$^7$ .............................. F16J 3/00; B32B 3/00
(52) U.S. Cl. ................... 277/628; 277/316; 277/646; 277/650; 428/71; 264/46.6; 264/45.2
(58) Field of Search .................... 277/316, 630, 277/646, 650, 652, 933, 931; 428/304.4, 192, 71; 264/45.2, 45.9, 46.1, 46.6

(56) References Cited

U.S. PATENT DOCUMENTS

| | | |
|---|---|---|
| 1,814,677 A | 1/1931 | Fennema |
| 3,054,636 A | 9/1962 | Wessells, III |
| 3,123,170 A | 3/1964 | Bryant |
| 3,493,257 A | 2/1970 | Fitzgerald et al. |
| 3,649,375 A | 3/1972 | Venkatesan |
| 3,665,968 A | 5/1972 | DePutter |

(List continued on next page.)

FOREIGN PATENT DOCUMENTS

| | | |
|---|---|---|
| DE | 2919046 | 5/1979 |
| DE | 9011147.8 | 9/1990 |
| DE | 4028895 C1 | 2/1992 |
| DE | 9320333.0 | 6/1994 |
| DE | 0 679 501 A1 | 11/1995 |
| DE | 196 35 734 A1 | 4/1997 |

(List continued on next page.)

OTHER PUBLICATIONS

Copending U.S. application Ser. No. 09/584,211, filed May 31, 2000.
Copending U.S. application Ser. No. 09/655,965, filed Sep. 6, 2000.
Copending U.S. application Ser. No. 09/858,939, filed May 16, 2001.
Copending U.S. application Ser. No. 09/859,126, filed May 16, 2001.
Copending U.S. application Ser. No. 09/906,289, filed Jul. 16, 2001.
Copending U.S. application Ser. No. 09/923,138, filed Aug. 6, 2001.

(List continued on next page.)

*Primary Examiner*—Anthony Knight
*Assistant Examiner*—E Peavey
(74) *Attorney, Agent, or Firm*—Dobrusin & Thennisch PC

(57) ABSTRACT

The present invention is directed to an expandable pre-formed plug that is suitable for sealing and/or structurally reinforcing a structure having surfaces defining a space therebetween. The plug is comprised of at least an expandable inner core having an outer surface and a transportable outer skin that preferably substantially encapsulates the core. In a preferred embodiment, the shape of the unexpanded plug is designed to mate with the surfaces that define a space therebetween upon expansion. The adhesive skin is generally dry to the touch at room temperature, however, upon initiation of expansion, the inner core expands and the surrounding skin is displaced in a coordinated manner. After some period of expansion, the outer skin preferably durably adheres or bonds to the walls of the surfaces defining a space therebetween and the outer surface of the core. A method for using such a plug is also disclosed.

23 Claims, 2 Drawing Sheets

U.S. PATENT DOCUMENTS

| | | |
|---|---|---|
| 3,746,387 A | 7/1973 | Schwenk |
| 3,757,559 A | 9/1973 | Welsh |
| 3,890,108 A | 6/1975 | Welsh |
| 4,019,301 A | 4/1977 | Fox |
| 4,029,128 A | 6/1977 | Yamagishi |
| 4,082,825 A | 4/1978 | Puterbaugh |
| 4,083,384 A | 4/1978 | Home et al. |
| 4,090,734 A | 5/1978 | Inami et al. |
| 4,238,540 A | 12/1980 | Yates et al. |
| 4,378,395 A | 3/1983 | Asoshina et al. |
| 4,397,490 A | 8/1983 | Evans et al. |
| 4,440,434 A | 4/1984 | Celli |
| 4,457,555 A | 7/1984 | Draper |
| 4,463,870 A | 8/1984 | Coburn, Jr. et al. |
| 4,559,274 A | 12/1985 | Kloppe et al. |
| 4,610,836 A | 9/1986 | Wycech |
| 4,613,177 A | 9/1986 | Loren et al. |
| 4,695,343 A | 9/1987 | Wycech |
| 4,705,716 A | 11/1987 | Tang |
| 4,732,806 A | 3/1988 | Wycech |
| 4,751,249 A | 6/1988 | Wycech |
| 4,762,352 A | 8/1988 | Enomoto |
| 4,769,391 A | 9/1988 | Wycech |
| 4,803,108 A | 2/1989 | Leuchten et al. |
| 4,813,690 A * | 3/1989 | Coburn ..................... 277/205 |
| 4,836,516 A | 6/1989 | Wycech |
| 4,853,270 A | 8/1989 | Wycech |
| 4,861,097 A | 8/1989 | Wycech |
| 4,898,630 A | 2/1990 | Kitoh et al. |
| 4,901,395 A | 2/1990 | Semrau |
| 4,901,500 A | 2/1990 | Wycech |
| 4,908,930 A | 3/1990 | Wycech |
| 4,917,435 A | 4/1990 | Bonnett et al. |
| 4,922,596 A | 5/1990 | Wycech |
| 4,923,902 A | 5/1990 | Wycech |
| 4,978,562 A | 12/1990 | Wycech |
| 4,984,406 A | 1/1991 | Friesen |
| 4,989,913 A | 2/1991 | Moore, III |
| 4,995,545 A | 2/1991 | Wycech |
| 5,040,803 A | 8/1991 | Cieslik et al. |
| 5,072,952 A | 12/1991 | Irrgeher et al. |
| 5,102,188 A | 4/1992 | Yamane |
| 5,122,398 A | 6/1992 | Seiler et al. |
| 5,124,186 A | 6/1992 | Wycech |
| 5,213,391 A | 5/1993 | Takagi |
| 5,255,487 A | 10/1993 | Wieting et al. |
| 5,266,133 A | 11/1993 | Hanley et al. |
| 5,344,208 A | 9/1994 | Bien et al. |
| 5,358,397 A | 10/1994 | Ligon et al. |
| 5,373,027 A | 12/1994 | Hanley et al. |
| 5,395,135 A | 3/1995 | Lim et al. |
| 5,506,025 A | 4/1996 | Otto et al. |
| 5,560,672 A | 10/1996 | Lim et al. |
| 5,575,526 A | 11/1996 | Wycech |
| 5,577,784 A | 11/1996 | Nelson |
| 5,580,120 A | 12/1996 | Nees et al. |
| 5,642,914 A | 7/1997 | Takabatake |
| 5,648,401 A | 7/1997 | Czaplicki et al. |
| 5,649,400 A | 7/1997 | Miwa |
| 5,652,039 A | 7/1997 | Tremain et al. |
| 5,707,098 A | 1/1998 | Uchida et al. |
| 5,725,272 A | 3/1998 | Jones |
| 5,731,069 A | 3/1998 | Delle Donne et al. |
| 5,755,486 A | 5/1998 | Wycech |
| 5,766,719 A | 6/1998 | Rimkus |
| 5,785,376 A | 7/1998 | Nees et al. |
| 5,786,394 A | 7/1998 | Slaven |
| 5,803,533 A | 9/1998 | Schulz et al. |
| 5,804,608 A | 9/1998 | Nakazato et al. |
| 5,806,915 A | 9/1998 | Takabatake |
| 5,806,919 A | 9/1998 | Davies |
| 5,819,408 A | 10/1998 | Catlin |
| 5,855,094 A | 1/1999 | Baudisch et al. |
| 5,866,052 A * | 2/1999 | Muramatsu ................ 264/46.6 |
| 5,871,849 A | 2/1999 | Lepine |
| 5,878,784 A | 3/1999 | Sales et al. |
| 5,884,960 A | 3/1999 | Wycech |
| 5,885,688 A | 3/1999 | McLaughlin |
| 5,888,600 A | 3/1999 | Wycech |
| 5,888,642 A | 3/1999 | Meteer et al. |
| 5,894,071 A | 4/1999 | Merz et al. |
| 5,901,528 A | 5/1999 | Richardson |
| 5,901,752 A | 5/1999 | Lundman |
| 5,902,656 A | 5/1999 | Hwang |
| 5,904,024 A | 5/1999 | Miwa |
| 5,932,680 A | 8/1999 | Heider |
| 5,934,737 A | 8/1999 | Abouzahr |
| 5,941,597 A | 8/1999 | Horiuchi et al. |
| 5,984,389 A | 11/1999 | Nuber |
| 5,985,435 A | 11/1999 | Czaplicki et al. |
| 5,988,734 A | 11/1999 | Longo et al. |
| 5,992,923 A | 11/1999 | Wycech |
| 5,994,422 A | 11/1999 | Born et al. |
| 6,003,274 A | 12/1999 | Wycech |
| 6,004,425 A | 12/1999 | Born et al. |
| 6,006,484 A | 12/1999 | Geissbuhler |
| 6,053,210 A | 1/2000 | Chapman et al. |
| 6,073,991 A | 1/2000 | Naert |
| 6,022,066 A | 2/2000 | Tremblay et al. |
| 6,033,300 A | 3/2000 | Schneider |
| 6,050,630 A | 4/2000 | Hochet |
| 6,058,673 A | 5/2000 | Wycech |
| 6,059,342 A | 5/2000 | Kawai et al. |
| 6,068,424 A | 5/2000 | Wycech |
| 6,077,884 A | 6/2000 | Hess et al. |
| 6,079,180 A | 6/2000 | Wycech |
| 6,082,811 A | 7/2000 | Yoshida |
| 6,090,232 A | 7/2000 | Seeliger et al. |
| 6,092,864 A | 7/2000 | Wycech et al. |
| 6,094,798 A | 8/2000 | Seeliger et al. |
| 6,096,403 A | 8/2000 | Wycech et al. |
| 6,096,791 A | 8/2000 | Born et al. |
| 6,099,948 A | 8/2000 | Paver, Jr. |
| 6,102,379 A | 8/2000 | Ponslet et al. |
| 6,102,473 A | 8/2000 | Steininger et al. |
| 6,103,341 A | 8/2000 | Barz et al. |
| 6,103,784 A | 8/2000 | Hillborn et al. |
| 6,110,982 A | 8/2000 | Russick et al. |
| 6,129,410 A | 10/2000 | Kosaraju et al. |
| 6,131,897 A | 10/2000 | Barz et al. |
| 6,135,542 A | 10/2000 | Emmelmann et al. |
| 6,146,565 A | 11/2000 | Keller |
| 6,149,227 A | 11/2000 | Wycech |
| 6,150,428 A | 11/2000 | Hanley, IV et al. |
| 6,152,260 A | 11/2000 | Eipper et al. |
| 6,153,709 A | 11/2000 | Xiao et al. |
| 6,165,588 A | 12/2000 | Wycech |
| 6,168,226 B1 | 1/2001 | Wycech |
| 6,174,932 B1 | 1/2001 | Pachl et al. |
| 6,247,287 B1 | 1/2001 | Takabatake |
| 6,189,953 B1 | 2/2001 | Wycech |
| 6,196,621 B1 | 3/2001 | VanAssche |
| 6,197,403 B1 | 3/2001 | Brown et al. |
| 6,199,940 B1 | 3/2001 | Hopton et al. |
| 6,232,433 B1 | 5/2001 | Narayan |
| 6,233,826 B1 | 5/2001 | Wychech |
| 6,237,304 B1 | 5/2001 | Wycech |
| 6,253,524 B1 | 7/2001 | Hopton et al. |
| 6,263,635 B1 | 7/2001 | Czaplicki |
| 6,270,600 B1 | 8/2001 | Wycech |
| 6,272,809 B1 | 8/2001 | Wycech |

| | | | |
|---|---|---|---|
| 6,276,105 B1 | 8/2001 | Wycech | |
| 6,277,898 B1 | 8/2001 | Pachl et al. | |
| 6,281,260 B1 | 8/2001 | Hanley, IV et al. | |
| 6,287,666 B1 | 9/2001 | Wycech | |
| 6,296,298 B1 | 10/2001 | Barz | |
| 6,305,136 B1 | 10/2001 | Hopton et al. | |
| 6,311,452 B1 | 11/2001 | Barz et al. | |
| 6,315,938 B1 | 11/2001 | Jandali | |

FOREIGN PATENT DOCUMENTS

| | | |
|---|---|---|
| DE | 196 48 164 A1 | 5/1998 |
| DE | 19812288 C1 | 5/1999 |
| DE | 197 53 658 A1 | 6/1999 |
| DE | 299 04 705 U1 | 7/1999 |
| DE | 19856255 C1 | 1/2000 |
| DE | 19858903 A1 | 6/2000 |
| EP | 82102135.9 | 3/1982 |
| EP | 90202150.0 | 8/1990 |
| EP | 91104546.6 | 3/1991 |
| EP | 94101343.5 | 1/1994 |
| EP | 0 891 918 A1 | 1/1999 |
| EP | 0 893 331 A1 | 1/1999 |
| EP | 0 893 332 A1 | 1/1999 |
| EP | 0 697 956 B1 | 6/1999 |
| FR | 2 539 693 | 1/1983 |
| FR | 2749263 A1 | 5/1996 |
| GB | 628863 | 3/1947 |
| GB | 8028960 | 9/1980 |
| GB | 2 156 412 A | 10/1985 |
| GB | 8725028 | 10/1987 |
| JP | 61118211 | 6/1986 |
| JP | 64-69308 | 3/1989 |
| JP | 64-69309 | 3/1989 |
| JP | 01164867 | 6/1989 |
| JP | 2-206537 | 8/1990 |
| JP | 5-38992 | 2/1993 |
| WO | WO 87/01978 | 4/1987 |
| WO | PCT/JP88/00029 | 1/1988 |
| WO | PCT/JP88/00029 | 7/1989 |
| WO | PCT/AU92/00468 | 9/1992 |
| WO | PCT/EP95/000896 | 3/1995 |
| WO | WO 95/32110 | 11/1995 |
| WO | PCT/US96/11155 | 7/1996 |
| WO | WO 96/37400 | 11/1996 |
| WO | PCT/US97/10693 | 6/1997 |
| WO | PCT/US97/07644 | 11/1997 |
| WO | PCT/US97/19981 | 11/1997 |
| WO | PCT/US98/16461 | 8/1998 |
| WO | PCT/US98/17994 | 9/1998 |
| WO | PCT/US98/08980 | 11/1998 |
| WO | PCT/US99/00035 | 1/1999 |
| WO | PCT/US99/00770 | 1/1999 |
| WO | PCT/US98/16461 | 2/1999 |
| WO | PCT/US99/01855 | 2/1999 |
| WO | PCT/US99/01865 | 2/1999 |
| WO | PCT/US99/04263 | 3/1999 |
| WO | PCT/US99/04279 | 3/1999 |
| WO | PCT/CA99/00424 | 5/1999 |
| WO | PCT/US99/10441 | 5/1999 |
| WO | PCT/US99/11109 | 5/1999 |
| WO | PCT/US99/11110 | 5/1999 |
| WO | PCT/US99/11194 | 5/1999 |
| WO | PCT/US99/11195 | 5/1999 |
| WO | PCT/EP99/03832 | 6/1999 |
| WO | WO 99/28575 | 6/1999 |
| WO | PCT/EP99/06112 | 8/1999 |
| WO | PCT/US99/18820 | 8/1999 |
| WO | PCT/EP99/07143 | 9/1999 |
| WO | PCT/US99/18832 | 9/1999 |
| WO | PCT/US99/24795 | 10/1999 |
| WO | PCT/DE99/04103 | 12/1999 |
| WO | PCT/EP99/09541 | 12/1999 |
| WO | PCT/EP99/09732 | 12/1999 |
| WO | PCT/EP99/09909 | 12/1999 |
| WO | PCT/EP99/10151 | 12/1999 |
| WO | PCT/US99/29986 | 12/1999 |
| WO | PCT/US99/29987 | 12/1999 |
| WO | PCT/US99/29990 | 12/1999 |
| WO | PCT/US99/29991 | 12/1999 |
| WO | PCT/US99/29992 | 12/1999 |
| WO | PCT/US00/00010 | 1/2000 |
| WO | PCT/EP00/00021 | 1/2000 |
| WO | PCT/US00/00497 | 1/2000 |
| WO | PCT/US00/01644 | 1/2000 |
| WO | WO 00/03894 | 1/2000 |
| WO | PCT/EP00/01474 | 2/2000 |
| WO | PCT/US00/02631 | 2/2000 |
| WO | PCT/AT00/00123 | 5/2000 |
| WO | WO 00/37302 | 6/2000 |
| WO | WO 01/54936 | 8/2001 |
| WO | WO 01/55523 A1 | 8/2001 |
| WO | WO 01/56845 A1 | 8/2001 |
| WO | WO 01/57130 A1 | 8/2001 |
| WO | WO 01/71225 | 9/2001 |
| WO | WO 01/83206 A1 | 11/2001 |

OTHER PUBLICATIONS

Copending U.S. application Ser. No. 09/939,152, filed Aug. 24, 2001.
Copending U.S. application Ser. No. 09/939,245, filed Aug. 24, 2001.
Copending U.S. application Ser. No. 09/974,017, filed Oct. 10, 2001.
Copending U.S. application Ser. No. 09/982,681, filed Oct. 18, 2001.
Copending U.S. application Ser. No. 60/324,497, filed Sep. 24, 2002.
Copending U.S. application Ser. No. 60/296,312, filed Jun. 6, 2001.
Copending U.S. application Ser. No. 60/317,009, filed Sep. 4, 2001.
Co–pending application Ser. No. 09/524,960, filed Mar. 14, 2000.
Co–pending application Ser. No. 09/524,961; filed Mar. 14, 2000.
Co–pending application Ser. No. 09/428,243; filed Oct. 27, 1999.
Co–pending application Ser. No. 09/460,322; filed Dec. 10, 1999.
Co–pending application Ser. No. 09/459,756; filed Dec. 10, 1999.
Co–pending application Ser. No. 09/502,686; filed Feb. 11, 2000.
Co–pending application Ser. No. 09/591,877; filed Jun. 12, 2000.
Co–pending application Ser. No. 09/631,211; filed Aug. 3, 2000.
Co–pending application Ser. No. 09/676,443; filed Sep. 29, 2000.
Co–pending application Ser. No. 09/676,335; filed Sep. 29, 2000.
Co–pending application Ser. No. 09/676,725; filed Sep. 29, 2000.

* cited by examiner

EXPANDABLE PRE-FORMED PLUG

FIELD OF THE INVENTION

This invention relates generally to an article and method for reinforcing and/or sealing hollow structures and structures including channels or spacing between surfaces, and more particularly to the use of expandable pre-formed plugs comprised of an expandable inner core and an outer skin which are suitable for reinforcing and/or sealing such structural members in a wide range of applications.

BACKGROUND OF THE INVENTION

Recently, there has been an increase in the need for selective reinforcement, sealing, and resonance frequency alteration of hollow portions of various structural components. As referred to herein, the term "hollow portions" is meant to be expansive and additionally includes channels and spacing between surfaces. Pre-formed reinforcements that utilize expandable formulations, such as heat-activated polymeric foaming materials, have been developed for those purposes.

Although sealing and/or structural reinforcements comprised of heat-activated expandable foams are known in the industry, such conventional reinforcements typically consist of an expandable article comprised of a monolithic structure. Such single component formulations must often integrate two different, but important functions. First, the material must expand to fill a cavity or void. Second, the same material should durably adhere or bond to a portion of the structure being reinforced and/or sealed.

Because two or more important functional tasks are being addressed by a single formulation, the design of single component formulation expandable materials usually requires various compromises and material tradeoffs. For example, a certain ingredient of a single formulation homogeneous matrix might improve the expansion of the formulation, yet hamper the adhesion of the reinforcement to a given structure. Conversely, an ingredient that facilitates adhesion could impede the thermal expansion of the part. Moreover, in a significant number of applications, it is desirable for the reinforcement to function as a resonance frequency dampening device to reduce or eliminate vibration, in addition to acting as a sealant to impede the flow of water, air and/or vapors through a cavity. Consequently, monolithic materials often tend to impose design constraints.

SUMMARY OF THE INVENTION

The present invention recognizes the disadvantages and limitations often associated with monolithic constructions and provides an improved expandable, pre-formed plug comprised of at least two formulations. By constructing a pre-formed plug from two or more different formulations, each individual formulation can be better suited, or "specialized," to address or "target" different primary functions. Such specialization allows the present invention to provide an improved plug and method for reinforcement, sealing and/or dampening that can reduce some or eliminate all of the aforementioned concerns, while providing increased expansion, better adherence, improved corrosion resistance, and/or enhanced barrier, sealing, and/or dampening properties. The present invention provides the additional advantage of being efficient, generally cost-effective, and useful in connection with a large number of applications.

In accordance with one aspect of the present invention, an expandable pre-formed plug is provided that is suitable for sealing and/or structurally reinforcing a structure having surfaces defining a space therebetween (which may comprise the topography of an integrated structure). The plug includes an inner, expandable core having an outer surface and an outer skin that substantially encapsulates the core. More preferably, the plug includes a heat-activated inner core and an outer skin that is displaceable, and still more preferably, which substantially encapsulates the inner core. The pre-formed shape of the uncured plug may be of a generic size or shape or may be specifically designed to mate with the inner surface of a hollow portion of the structural member upon expansion. The outer skin is generally dry to the touch at room temperature. Upon application of a predetermined amount of heat, which generally initiates partial or complete curing, the core expands and the surrounding skin is displaced in a coordinated manner so the skin can contract and therefore durably adhere or bond to the walls of the structural member and the outer surface of the core. If necessary or desirable, the plug can further include one or more integrated or attached locating and attachment devices that can be used to temporarily locate or facilitate the orientation or placement of the plug in a given application.

In accordance with another aspect, the present invention provides a method for reinforcing and sealing a structure having surfaces defining a space therebetween. The method including the steps of: (i) providing a structure having surfaces defining a space therebetween; (ii) providing an expandable pre-formed plug having an inner, expandable core and a displaceable outer skin which substantially surrounds the core; (iii) inserting the plug into the space defined between two surfaces; and (iv) causing the plug to expand to cause the skin to bonding surface and therefore durably adhere or bond said surfaces.

BRIEF DESCRIPTION OF THE DRAWINGS

The present invention will be more readily understandable from consideration of the accompanying drawings, wherein.

DETAILED DESCRIPTION OF PREFERRED EMBODIMENTS

Detailed descriptions of a preferred embodiment are provided herein. However, it is to be understood that the present invention may be embodied in many forms. Therefore, specific details disclosed herein are not to be interpreted as limiting, but rather as the basis for the claims and a representative basis for teaching one skilled in the art to employ the present invention in virtually any appropriate structure.

Figure 1:
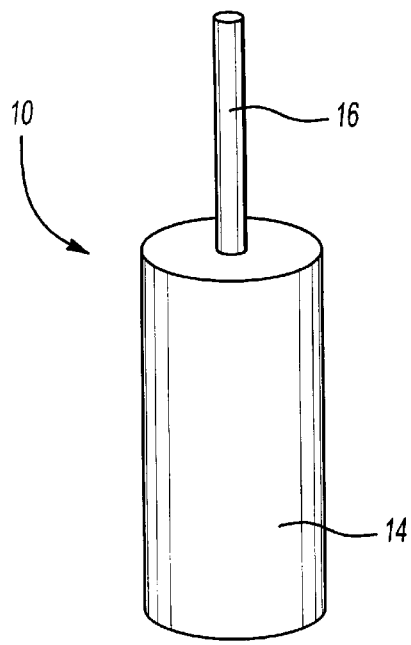
FIG. 1 is a perspective view of an embodiment of a plug constructed in accordance with the present invention.
Figure 2:
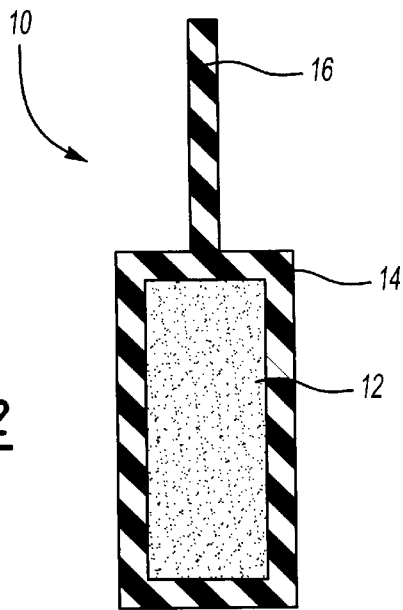
FIG. 2 is a front cross-sectional view of the plug shown in FIG. 1.
Figure 3:
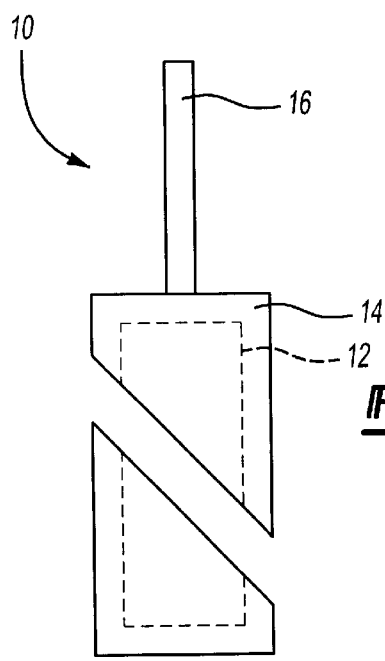
FIG. 3 is a front view of the plug shown in FIG. 1 in which a top portion has been cut away for illustrative purposes.
Figure 4:
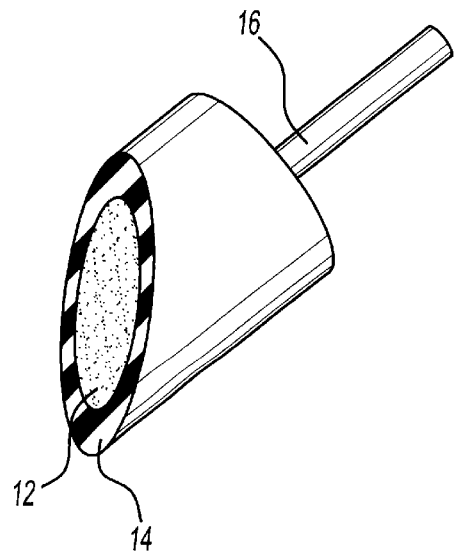
FIG. 4 is a perspective view of the top portion of the plug depicted in FIG. 3.

Referring to FIGS. 1 and 2, an embodiment of a pre-formed plug 10 in accordance with the principles of the present invention is shown. The pre-formed plug 10 preferably is comprised of a heat-activated, thermally expandable inner core 12 and a stretchable outer skin 14 that generally surrounds and encapsulates the inner core 12. It is important to point out that while the depicted embodiment of the plug 10 is generally cylindrical, the plug 10 can be formed in an unlimited number of shapes and sizes to meet the needs of a given application without departing from the present invention. Also, while it is preferred that the skin 14 encapsulate the entire core 12 to improve and facilitate expansion and/or sealing, the principles of the invention do not require the complete encapsulation of the core.

It also should be noted that one preferred embodiment contemplates a heat-activated expandable core. However, other core materials are possible such, as without limitation, an encapsulated mixture of materials that when activated by temperature, pressure, chemically, or otherwise, will expand.

In accordance with the present invention, the plug 10 may also include one or more optional extensions. The optional extensions can, but do not have to be, comprised of the same material as the outer skin 14. When such an extension is included, the extension can be integrally formed with the skin 14 of the plug 10, or separately formed and adapted to function in connection with the plug 10. Generally, the principal purpose of an extension is to facilitate placement and to maintain the position and/or the orientation of the plug 10 within a structural member. The extension can include temporary portions that dissolve, disintegrate or are otherwise disassociated from the plug some time after a requisite level of expansion is achieved. Further, the construction of such extensions can be tailored for a specific structure or application and can provide the added benefit of maintaining the position and orientation of an unexpanded plug 10 within a structure while reducing or eliminating the number of additional temporary or permanent locating devices. In the context of the present invention, though not necessarily suitable in all applications involving heat-activated structural materials, the extension may include integral pins, extension rods, hooks, fasteners, clips, snap attachments, or the like. An example of a very simple extension 16 that is formed integrally with the outer skin 14 is shown in the illustrated embodiment.

In keeping with one of the principle objects of the invention, the inner core 12 is preferably comprised of a heat-activated, thermally expandable polymeric formulation. Examples of base materials that can be used in the formulation of the inner core 12 include ethylene copolymers or terpolymers. The monomers that may be used to create the polymer, for instance, without limitation, vinyl acetate, methylacrylate, ethyl acrylate, and alpha olefins. Copolymer or terpolymer, is composed of two or three different monomers, i.e., small molecules with high chemical reactivity that are capable of linking up with similar molecules.

While other materials are possible, one preferred inner core 12 is formed from materials that yield a polymeric structural foam. Such structural foams typically include a polymeric base material, such as an epoxy resin or ethylene-based polymer which—when compounded with appropriate ingredients (typically including a blowing agent)—expands and cures in a reliable and predictable manner upon the application of heat. The resulting material has a density sufficient to impart desired rigidity to a supported article. In one embodiment, prior to curing, the foam starting material is provided as a body that can be subsequently processed in a like manner as a thermoplastic material. Following curing, the foam may become cross-linked.

Examples of preferred formulations that are commercially available from L&L Products of Romeo, Mich., are those offered under the trade names L-5206, L-5207, L-5208, L-5209, L-2106, L-4300, and L-4500. Those formulations can be broken down into two main functional categories, those that are predominantly directed to structural reinforcement, and those that are primarily directed to sealing applications.

The properties that dictate whether particular structural foam issuitable for an application or not include plastic modules, glass transition temperature yield stress, yield strain, and expansion.

For some reinforcement-based applications, the expanded core 12 should be capable of absorbing energy when placed in compression. For structural reinforcement applications, the L-5206, L-5207, L-5208, and L-5209 formulations are usually preferred. Conversely, for sealing-type applications, the level of volumetric expansion may predominate the structural rigidity of the expanded cells. The L-2106, L-4300, and L-4500 formulations are generally preferable for applications predominantly directed to sealing functions.

While preferred materials for forming the core 12 have been disclosed, the inner core 12 can instead be formed from other materials provided that the material is heat-activated or otherwise activated by an ambient condition or other external stimulus (e.g., moisture, pressure, thermal energy, chemicals, radiation, time or the like) and expands in similar predictable and reliable manner under appropriate conditions for the application. Typically, the core will be formulated from a relatively rigid polymer that has a softening point around the same temperature that you get blowing agent decomposition. Some possible materials include, but are not limited to, formulations based on polymers such as polyolefin materials, copolymers and terpolymers with at least one monomer type an alpha-olefin, phenol/formaldehyde materials, phenoxy materials, and polyurethane materials.

In applications where a heat-activated, thermally-expanding materials is employed, an important consideration involved with the selection and formulation of the material used to form the core 12 is the temperature at which a material reaction or expansion, and initiation of curing, will take place. For instance, in most applications, it is undesirable for the material to be reactive at room temperature or otherwise at the ambient temperature of a production line or manufacturing environment. Preferably, the inner core 12 will become reactive at higher processing temperatures, such as those encountered in an automobile assembly plant when such core is processed along with the automobile components at elevated temperatures or at higher applied energy levels. While temperatures encountered in an automobile assembly operation may be in the range of about 148.89° C. to 204.44° C. (300° F. to 400° F.), body and paint shop applications are commonly about 115° C. (239° F.) or slightly higher. If needed, blowing agent activators can be incorporated into the composition to cause expansion at different temperatures outside of the above ranges.

The curing of the formulations of the plug 10 can be particularly important in applications in which the plug 10 will undergo several thermal cycles. In such instances, proper curing of the plug 10 and the component formulations helps ensure that the expanded formulations provide the necessary level of structural support without collapsing during subsequent heating.

A feature of the invention is the ability to separately tailor and address the respective functions of expansion and adhesion in two different components, i.e., the inner core 12 and the outer skin 14. Because the core 12 of the present invention is primarily concerned with driving the expansion, not promoting contact adhesion to the structural member being reinforced, the formulation material composition of the core 12 can be advantageously simplified and possibly even more stable than that provided by previously available materials. Comparatively, some single-formulation reinforcements require eighteen or more ingredients. Such complexity can result in a higher degree of reactivity and, as a result, reduced shelf life.

The outer skin 14 lies upon at least a portion of the outer surface of the inner core 12. In one preferred embodiment, the outer skin 14 substantially surrounds the core 12. While the invention is not limited to a set material configuration, the outer skin typically comprises from about 1% to about 30% by weight of the plug 10, and more preferably from about 10% to 20%. The outer skin 14 is about 1% to about 40% of the radius of the article. Thus, for a plug 10 with a radius of about 5 mm., the outer skin 14 will comprise about 1 mm. of the total radial thickness. In a preferred embodiment of the invention, the outer skin 14 completely encapsulates the inner core 12. The outer skin 14 preferably will (i) stretch and/or be transported in a coordinated manner with the inner core 12 as the core 12 expands outwardly, for example, during foaming and (ii) adhere or bond with the structural member being "plugged," i.e., reinforced, dampened and/or sealed. Because the inner core 12 provides the primary or driving expansion, it is not necessary (though still possible) for the outer skin 14 to expand independently of the core 12.

In one embodiment, the outer skin 14 functions effectively as a balloon surrounding the core 12, and will expand with the expanding core 12. Upon the application of heat, the core 12 will generally expand to at least 1000% the volume of the unexpanded volume of the core 12, but expansions of greater than 2500% are possible. As the inner core 12 expands, the outer skin 14 will stretch and its wall thickness will become thinner. To provide proper functional properties, the outer skin 14 should be thick enough to remain substantially intact both during and following the expansion process.

For some applications, the outer skin 14 can also be formulated and tailored to independently expand. As such, the outer skin 14 can be designed to expand faster than, or in approximate sync with, the expansion of the core 12, as may be necessary or desirable for improved and/or coordinated expansion. However, the independent expansion of the outer skin 14 can involve additional functional complexity and added expense, which may or may not be warranted.

The outer skin 14 preferably includes an adhesion-promoting material, such as an adhesive, bonding agent, cement, primer, or other coating capable of forming at least a bond (and preferably an adhesive bond) with the structure it contacts and the core 12. To illustrate a preferred embodiment, the outer skin is also comprised of a non-pressure sensitive, epoxy-based material. Because the outer skin 14 may address functions aside from driving the expansion of the plug 10, other modification may be made to achieve a desired function or functions, such as providing durable adhesion, a tight seal or an improved dampening effect. Examples of other suitable adhesives include, without limitation, polyolefin materials modified with adhesion promoting functional groups such as silane, or maleic anhydride, polyacrylates, polyurethanes, etc.

When selecting a material for the outer skin 14, consideration is given to both melt temperature and flow characteristics of the materials. In most cases, it is preferred that the material will have limited flow, so that the material will expand outwardly rather than simply melt and ooze. Furthermore, for many structural applications, the adhesive is preferably stiff enough for load transfer to occur and strong enough for load transfer to occur. As such, the adhesive material should be comprised of an adhesive capable of developing a sufficient bond for sufficient load transfer to occur should the material be used in a structural application.

Today, typical expandables have a range in expansion from about 0 to over 1000 percent. However, in certain applications, the level of expansion of the core 12 of this invention can be substantially improved, and increased to as high as about 1500 percent or more. Such improved expansion is improved by increasing the area of encapsulation so that the outer skin 14 encapsulates the core 12 in substantial entirety. Such substantial or complete encapsulation reduces the amount of water absorption.

The practice of the present invention in primarily separating the functions of expansion and bonding or adhesion into two or more separate formulations or components offers one or more advantages in many applications. For instance, because additional amounts of the material forming the outer skin optionally do not need to be interspersed within a matrix along with the thermally-expanding material of the inner core, the expansion of the plug 10 can be improved. Likewise, because the adhesive function is separated from the primary expansion function, the formulation of the outer skin, and adhesive therein, can be better metered and more precisely tailored for superior adhesion or bonding because the skin 14 does not require built-in compromises to drive the expansion of the plug 10. As such, the skin 14 can be less costly, easier to formulate, and potentially provide improved moisture resistance barrier and means for corrosion protection than when compared to previously available foams. Thus, the inclusion of multiple types of materials allows for precision and control in tailoring desired properties in the overall plug 10.

The present invention also provides that added benefit of allowing the manufacturer to purchase and store commodity raw materials in greater quantities because it is easier to interchange raw materials in and out of the different core formulation. This allows for a higher number of potential sealing applications than could be properly addressed by a single-formulation part as well as permitting more commonality among parts by reducing complexity and using less expensive formulations. Further, it is now a common practice to design or formulate a new part for each application. Because of the unusually high amount of expansion associated with the present invention, manufacturers are able to produce more single-type designs or "stock" plugs 10 for multiple applications.

Though other techniques of manufacture may be employed, and without intending to limit the manner of manufacture of the plug 10 of the present invention, in a preferred embodiment, the plug 10 is constructed in two stages. The first stage involves the compounding and/or pelletizing of the formulations that will be used to form the core 12 and outer skin 14. To perform the compounding operation, the material is heated to enable adequate mixing. In this stage, two conditions should be carefully avoided—excessive heat and excessive shear. The second stage involves the use of a process such as the mono-sandwich injection molding process, a co-injection process, to mold the formulations into a multi-component plug 10.

Co-injection, or sandwich molding is a technique commonly used for injection molding articles having a skin of one type of thermoplastic and a core of another compatible thermoplastic, thus permitting one component formulation, i.e., the inner core 12, to be encapsulated, partially or wholly, by the other, i.e., the outer skin 14. Moreover, by using such a molding process, the pre-formed plug 10 can be molded or formed in virtually an unlimited number of shapes, sizes and configurations, generally limited only by the capabilities of the mold design and molding equipment.

Although mono-sandwich molding is a preferred technique for forming the plug 10, the plug 10 is not process-dependent and other conventional processing techniques that provide for the formation of a plug 10 having a core/skin structure as described herein are also suitable. For example, insert injection molding, or multi-cavity injection molding, and extrusion molding can all be used to form an acceptable plug 10.

A further aspect of the present invention is the method of using a plug 10 having a core 12 and outer skin 14, of the type described herein, to structurally reinforce, seal, and/or dampen a cavity of a structural component. For example, many cavities in transportation vehicles, such as automobiles, are susceptible to wind passage or noise passage through the vehicle. The goal is to block those passages off to prevent that noise from passing through the vehicle. The noise is usually in the form of wind noise or noise or structure-born noise. In either case, the plug 10 can be used to reduce the amount of noise generated from hollow structures. The method of the present invention can be used in a number of places in an automobile including, without limitation, A-pillars, B-pillars, C-pillars, the hinge pillar area, rocker panels, the wheel hubs area, motor rails, and similar structures. Effectively, where a joint is desired to bridge spaced surfaces in an automobile structure, the plug of the present invention can assist in achieving such objectives.

The method for reinforcing, sealing and/or damping a structure generally includes the steps of: providing a structure having surfaces defining a space therebetween; providing an expandable pre-formed plug having an inner, expandable core having an outer surface and a displaceable outer skin which substantially surrounds the core; inserting the plug into the space defined between said surfaces hollow portion of the structure; and causing the plug to expand and durably adhere or bond to said surfaces.

Figure 5:
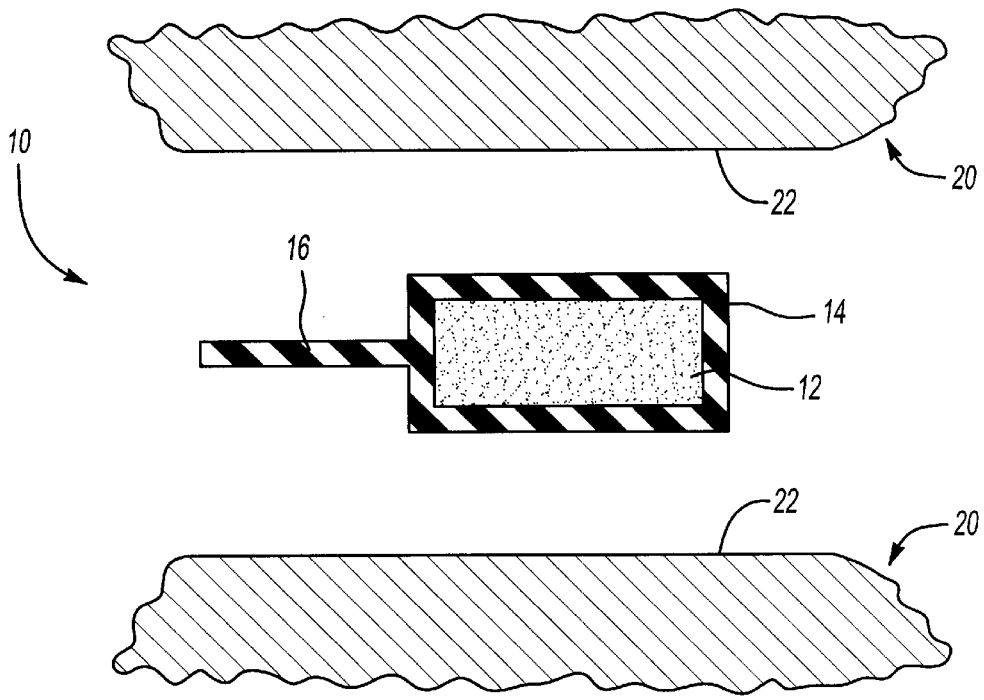
FIG. 5 is a sectional view of a plug positioned within a cavity of a structural member prior to initiating heating and expansion.

With reference to FIG. 5, there is shown a pre-formed plug 10 formed in accordance with the principles of the present invention. As illustrated, the plug 10 includes an inner core 12 and an outer skin 14 of the type previously described herein and is inserted or disposed within a hollow portion, or cavity of a structural member 20. Heat is provided to the structural member 20 and the plug 10. Upon application of given level of heat, the core 12 will thermally expand and will completely or significantly drive the expansion of the outer skin 14. The outer skin 14 expands in a coordinated manner with the core 12, at least until the skin 14 comes into proximate contact with the inner walls 22 of the structure member that define the cavity.

Figure 6:
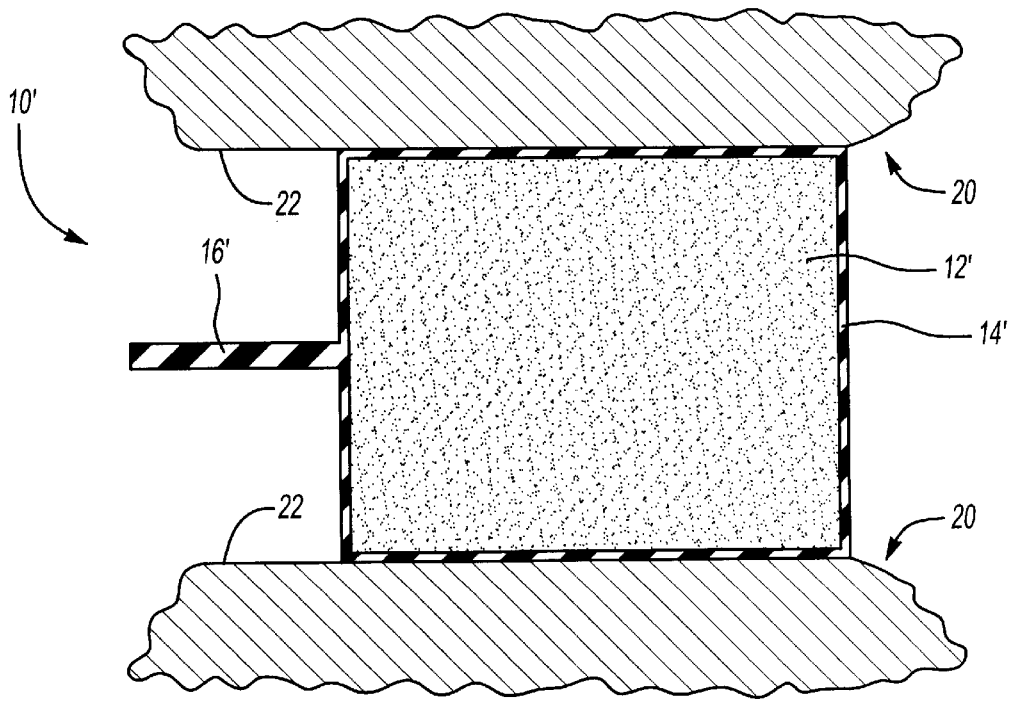
FIG. 6 is a sectional view of the plug shown in FIG. 5 after initiation of heating and expansion.

FIG. 6 illustrates a sectional view of the plug 10' after it has undergone expansion, and, generally speaking, is substantially or fully cured. As shown, the expanded core 12' has expanded to several times initial unheated or uncured size. As a related consequence, the walls of the expanded outer skin 14' have been stretched and thinned out.

Before providing the requisite application of heat to expand the core 12, the plug 10 is first affixed or placed at or near a desired location for reinforcement or sealing within a hollow portion or cavity of a structural member 20 during the assembly phase. For instance, the plug 10 can be installed in the body shop, assembly plant or during a stamping operation. In a preferred embodiment, the structural member 20 with the plug 10 disposed therein are heated to a certain temperature by ovens or a curing or coating process. After the plug 10' undergoes sufficient heating, it expands and durably adheres or bonds to the structural member 20 reinforcing the same and forming a seal as per the geometry of the hollow portion of the structural member 20. To obtain the optimum properties from the expanded plug 10', it is important that the core 12' is fully cured.

In cases when it is desirable to completely fill a given cavity or hollow portion of a structural member 20, more than one plug 10 can be appropriately spaced within the cavity so that as the plugs 10 expand, they will adhere to one another and "knit" together. It is also possible to incorporate conventional measures to further promote the adhesion of the outer skin 14 of the plug to a structural member. For example, the surface of the walls 22 of the structural member 20 can be pre-treated with a spray or application of a coating designed to further adhere or bond the expanded skin 14.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications will come within the teachings of this invention and that such modifications are within its spirit and the scope as defined by the claims.

What is claimed is:

1. An expandable, pre-formed plug suitable for sealing or structurally reinforcing surfaces defining a space therebetween, said plug comprising:

a substantially non-compressed, polymer based expandable, inner core having an outer surface; and an expandable outer skin that substantially encapsulates the core, the skin having a wall thickness;

wherein, upon application of an external stimulus, the core expands to at least 1000% of its original volume and facilitates the displacement of the outer skin in a coordinated manner until at least a portion of the outer skin contacts a portion of the surfaces defining the space and wherein the skin is non-porous after its displacement and the wall thickness becomes thinner upon expansion of the core.

2. A plug as recited in claim 1, wherein said external stimulus is selected from the group consisting of heat, radiation, thermal energy, pressure, chemicals and moisture.

3. A plug as recited in claim 1, wherein the core is formulated from a base material selected from the group consisting of ethylene copolymers; ethylene terpolymers; monomers used to create a polymer, and epoxy-based structural foams.

4. A plug as recited in claim 3, wherein the monomer used to create a polymer is selected from the group consisting of vinyl acetate, methylacrylate, ethyl acrylate, and alpha olefins.

5. A plug as recited in claim 1, wherein the outer skin is non-pressure-sensitive.

6. A plug as recited in claim 1, wherein the outer skin completely encapsulates the inner core.

7. A plug as recited in claim 1, wherein the core is not reactive at room temperature.

8. A plug as recited in claim 1, wherein the outer skin includes an adhesive.

9. A plug as recited in claim 1, wherein the surface of the outer skin is dry to the touch at room temperature.

10. A plug as recited in claim 1, wherein the outer skin is durably adhered or bonded to a portion of the structural member following the expansion of the plug.

11. A plug as recited in claim 1, wherein the shape of the unexpanded plug is designed to facilitate mating with the surfaces defining a space therebetween upon expansion.

12. A plug as recited in claim 1, wherein the plug includes at least one extension.

13. A plug as recited in claim 12, wherein the extension is integrally formed with the outer skin of the plug.

14. A plug as recited in claim 12, wherein the extension is formed from a different material than that of the outer skin.

15. A plug as recited in claim 12, wherein the extension is comprised of a material that remains substantially rigid following the expansion of the plug.

16. A plug as recited in claim 1, wherein the extension is designed to mechanically engage a portion of the surfaces defining a space therebetween.

17. A method suitable for reinforcing and sealing surfaces defining a space therebetween, including the steps of:
   providing a structure with surfaces defining a space therebetween;
   providing an expandable pre-formed plug having a substantially non-compressed, polymer based inner, expandable core with an outer surface and a transportable outer skin that substantially surrounds the core, the outer skin having a wall thickness;
   positioning said plug between the surfaces defining a space therebetween; and
   causing said inner core to expand to at least 1000% of its original volume and transport the outer skin of the plug wherein the skin is non-porous after its transport and the wall thickness becomes thinner upon expansion of the core.

18. The method as recited in claim 17, wherein the plug is expanded and the outer skin is in communication with the walls of the surfaces defining the space therebetween and the outer surface of the inner core.

19. The method as recited in claim 17, wherein the plug includes an extension that assists in positioning the plug within the surfaces defining the space therebetween prior to the expansion of the plug.

20. The method as recited in claim 17, wherein the expansion of the plug is initiated by the application of an external stimulus selected from the group consisting of heat, radiation, thermal energy, pressure, chemicals and moisture.

21. The method as recited in claim 20, wherein the external stimulus is controllable.

22. The method as recited in claim 21, wherein the external stimulus is readily available in connection with a manufacturing process.

23. The method as recited in claim 17, wherein the volume of the plug following expansion of the core is at least twice the volume of plug prior to the expansion of the core.

* * * * *